Feb. 7, 1961 S. KAMAROVSKY 2,970,374
METHOD OF MANUFACTURING PEG TYPE
HARROW TOOTH ASSEMBLIES
Filed June 26, 1957
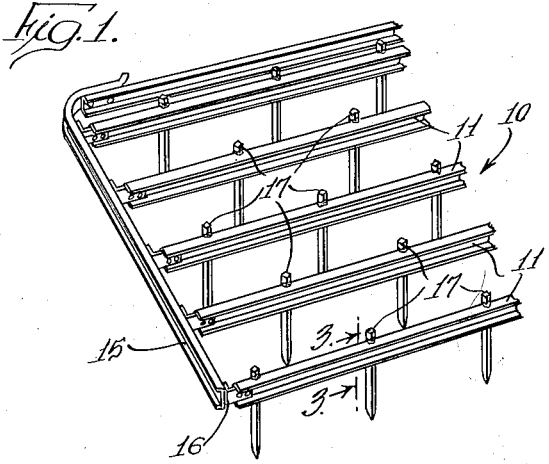
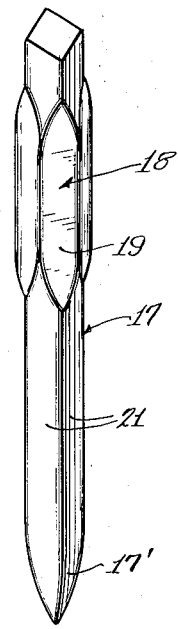
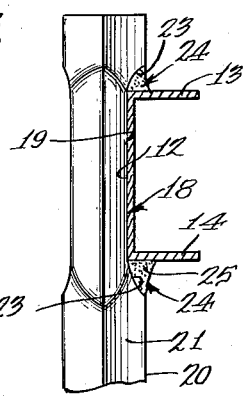
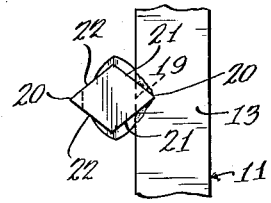
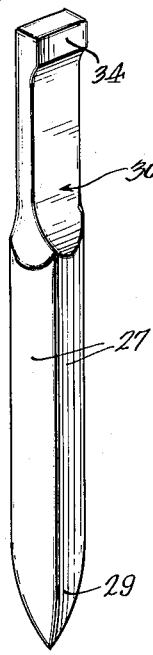
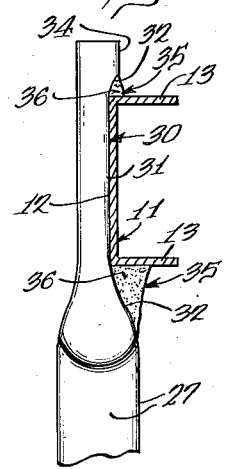
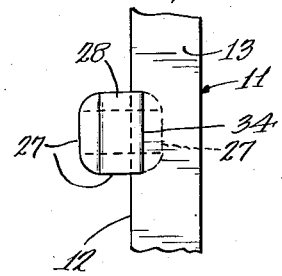
INVENTOR.
Serge Kamarovsky
BY Paul O. Pippel
Atty:

United States Patent Office 2,970,374
Patented Feb. 7, 1961

2,970,374

METHOD OF MANUFACTURING PEG TYPE HARROW TOOTH ASSEMBLIES

Serge Kamarovsky, Chicago, Ill., assignor to International Harvester Company, Chicago, Ill., a corporation of New Jersey Filed June 26, 1957, Ser. No. 668,167

1 Claim. (Cl. 29—471.1)

This invention relates to the manufacture of peg tooth harrows. More specifically it relates to a process of making harrow teeth and securing the same to the supporting structure of a harrow assembly.

It is a prime object of this invention to provide an improved method of forming and securing peg type harrow teeth to the beam and supporting structure of a peg tooth harrow.

Still another object is to provide an improved method of manufacturing peg type harrow teeth so that they will be readily adaptable for welding connection with the supporting beam of a harrow.

A still further object is the provision of an improved method comprising the steps of forming the upper ends of harrow teeth to provide a recess with oppositely disposed curved portions, placing said curved portions of a harrow tooth in position on a supporting beam to provide therewith opposed fillets, and placing a weld material in said fillets to secure the tooth and supporting beam in assembly.

These and other objects will become more readily apparent from a reading of the description when examined in connection with the accompanying sheet of drawing.

In the drawing:

Figure 1 is a perspective view showing a portion of an improved peg type harrow assembly;

Figure 2 is a perspective view of an improved peg type harrow tooth;

Figure 3 is an enlarged detail view showing the upper portion of a harrow tooth and its relation to a supporting beam in a step in the improved method;

Figure 4 is a plan view of the assembly shown in Figure 3;

Figure 5 is a perspective view of a modified form of peg tooth manufactured with the improved process;

Figure 6 is an elevational view showing the upper end of a modified peg tooth in the process of being connected to the supporting beam of a harrow, and Figure 7 is a plan view of the assembled structure shown in Figure 6.

In the process of connecting harrow teeth to the laterally or transversely extending supports or beams of a peg type harrow, it has been customary to utilize various mechanical straps and bolt fasteners for accomplishing an assembled construction. Harrow teeth are generally of quadrilateral shape and are usually made by the forging process. In the past these quadrilaterally shaped narrow teeth have been positioned with one corner of the tooth in contiguous contact with the face or upright surface of the beam to which it is connected by a suitable strap. "A corner" is meant to define a sharp vertical edge which is formed adjacent the juncture of two of the sides or vertical surfaces of the tooth. This positioning of the teeth has been satisfactory in cases where connecting straps have been utilized but such positioning (and particularly with the shape of the conventional tooth) has not lent itself to the use of up-to-date welding processes such as the submerged arc type of process, or the consumable electrode gas shielded arc welding process.

The present improved process therefore contemplates the shaping of a harrow tooth to an extent whereupon, in the process of assembly with a beam, the welding characteristics are extremely favorable and an improved structure results.

Referring now to Figure 1, the improved process hereinbelow described has resulted in a harrow assembly generally designated by the reference character 10. The harrow assembly 10 comprises a plurality of substantially parallel and laterally extending U-shaped or channel supports, each of which has a vertical surface 12 and normally horizontal surfaces 13 and 14 respectively. Only one side of the harrow 10 is shown and one of oppositely disposed side bars 15, which are connected to the supports 11, is disclosed. Suitable straps 16 are provided to achieve the connection of the side bars 15 to the beams 11.

Figures 2, 3 and 4 disclose a peg tooth 17 manufactured by applicant's improved process. The peg tooth 17 includes a pointed or ground engaging end 17' and is provided at an upper securing or attaching portion with a plurality of recessed portions 18. Each recessed portion 18 comprises a flat surface 19 which is disposed downwardly from the upper terminal end of the peg tooth 17. The recessed portion 18 includes a flat surface 19 which is disposed inwardly from a vertically extending corner formed by adjacent sides 21 of the peg tooth 17. The recessed portions 18 may be formed by a forging operation or may be suitably processed by grinding or other well-known manufacturing processes. The sides 21 and 22 form four corners as indicated. It is noted that the flat surfaces 19 intersect two sides 21 and two sides 22, and that a perpendicular plane from said flat surfaces 19 intersects an imaginary line coincident with the opposed corners 20 from which the flat surfaces 19 are recessed.

In the manufacture the method includes forming a pair of arcuate end sloping surfaces 23 which begin from opposite ends of the flat surface 19 and terminate in the corner 20. The arcuate surfaces 23 form, when placed in position with respect to the channel support 11, and specifically with the surfaces 13 and 14, oppositely disposed fillets 24. Thus when the recessed portion 18 is placed in the position shown in Figures 3 and 4, with respect to the channel 11, the fillet pockets 24 are formed. The next step in the process is to fill these pockets 24 with an upper end. The flattened securing portion 30 may be suitably formed during the forging operation or it may be formed by other flattening means, such as by grinding or other well-known processes. The recessed portion 30 comprises a flat surface 31 having at its opposite ends sloping portions 32 and 32'. The sloping portion 32 terminates in the one surface 27 and the sloping surface 32' terminates in a flattened upper portion 34. The securing portion 30 thus is recessed with respect to the surfaces 34 and 27 and in the improved process is placed in the position shown in Figure 6 with respect to the supporting beam 13. This positioning forms fillet pockets 35 disposed on opposite sides of the supporting beam 11 and the next step in the process is to place a weld 36 into the fillet pockets to securely fasten the upper end of the peg tooth to the supporting beam 11.

Thus the improved process comprises essentially of providing recessed portions of the peg tooth, which may be done by forging or other suitable means, and then by placing the recessed portions in relation to the supporting beam so that oppositely disposed fillet pockets are presented by the surfaces 13 and 14 and by the sloping surfaces 23, the process then further including the placing of a securing means such as a weld into the fillet pockets to effectuate securing of the peg teeth to the supporting member.

Thus it is readily apparent that an improved process of manufacturing peg tooth assemblies has been disclosed. It must be understood that changes and modifications may be made without departing from the spirit of the invention as disclosed or the scope thereof as defined in the appended claim.

What is claimed is:

A method of fastening a peg type harrow tooth having a generally quadrilaterally shaped elongated body with a pointed part at its normally lower end and a securing part adjacent its normally upper end, to a transversely extending supporting beam having a normally vertical surface and upper and lower horizontal surfaces, comprising the steps of providing a recessed portion on said securing part including a flat surface being disposed downwardly from the upper end and disposed inwardly from a corner formed by the junction of two sides of said body, whereby a plane perpendicular to the plane of said flat surface intersects an imaginary vertical line coincident with said corner, providing said recessed portion with opposed arcuate surfaces sloping from the flat surface and terminating at said corner, placing said vertical surface of said supporting member in engagement with said flat surface whereby said arcuate surfaces overlap said horizontal surfaces to form therewith oppositely disposed fillets, and securing said tooth to said supporting member by filling said fillets with a weld material.

References Cited in the file of this patent

UNITED STATES PATENTS

| | | |
|---|---|---|
| 217,320 | Beauregard | July 8, 1879 |
| 1,308,637 | Merkt | July 1, 1919 |
| 2,192,904 | Ferris | Mar. 12, 1940 |
| 2,710,443 | Webb | June 14, 1955 |